US012362668B2

(12) United States Patent
Corbishley

(10) Patent No.: US 12,362,668 B2
(45) Date of Patent: Jul. 15, 2025

(54) ENERGY SUPPLY CIRCUIT

(71) Applicant: Nordic Semiconductor ASA, Trondheim (NO)

(72) Inventor: Philip Corbishley, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 218 days.

(21) Appl. No.: 18/029,339

(22) PCT Filed: Oct. 4, 2021

(86) PCT No.: PCT/EP2021/077277
§ 371 (c)(1),
(2) Date: Mar. 29, 2023

(87) PCT Pub. No.: WO2022/069763
PCT Pub. Date: Apr. 7, 2022

(65) Prior Publication Data
US 2023/0369974 A1    Nov. 16, 2023

(30) Foreign Application Priority Data

Oct. 2, 2020  (GB) .................................... 2015686

(51) Int. Cl.
*H02M 3/158*    (2006.01)
*H02M 1/00*    (2006.01)
(Continued)

(52) U.S. Cl.
CPC ......... *H02M 3/158* (2013.01); *H02M 1/0009* (2021.05); *H02M 1/009* (2021.05); *H02M 3/06* (2013.01); *H02M 3/157* (2013.01)

(58) Field of Classification Search
CPC .... H02M 3/158; H02M 1/009; H02M 1/0009; H02M 3/06; H02M 3/157
See application file for complete search history.

(56) References Cited

U.S. PATENT DOCUMENTS

| 3,956,687 A | 5/1976 | Lindenman |
| 7,994,766 B2 * | 8/2011 | De Lima Filho ..... H02M 3/158 323/277 |

(Continued)

FOREIGN PATENT DOCUMENTS

| CN | 108011437 A | 5/2018 |
| EP | 2 672 616 A2 | 6/2013 |

(Continued)

OTHER PUBLICATIONS

Communication pursuant to Article 94(3) received for PCT Application No. 21786898.3, Dec. 5, 2024, 13 pages.

(Continued)

*Primary Examiner* — Rafael O De Leon Domenech
(74) *Attorney, Agent, or Firm* — Klarquist Sparkman, LLP

(57) ABSTRACT

A circuit portion is provided which includes an energy harvesting device producing a DC output; a DC-DC converter having an input connected to the DC output of the energy harvesting device; an output for connection to a load; and a monitoring module including a non-ohmic semiconductor element. The monitoring module is arranged to derive information relating to an output current flowing from the DC-DC converter by measuring a current through the non-ohmic semiconductor element. The monitoring module is (Continued)

Figure 1:
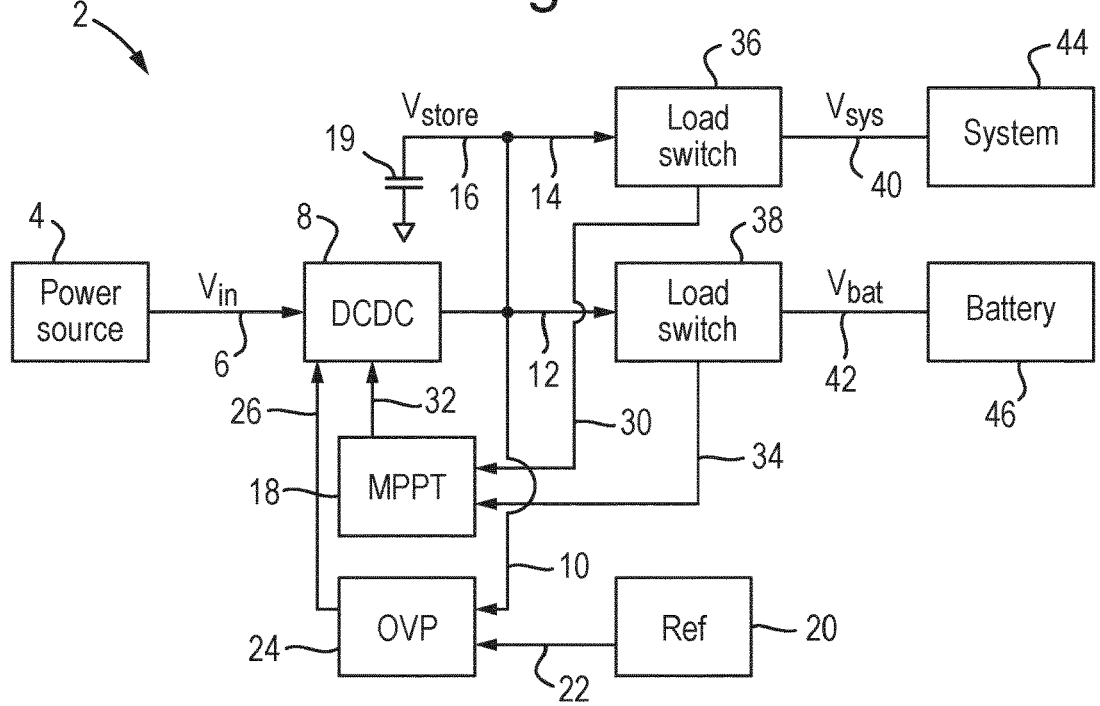

arranged to adjust one or more parameters of the DC-DC converter based on the information relating to said output current flowing from the DC-DC converter.

14 Claims, 1 Drawing Sheet

(51) Int. Cl.
*H02M 3/06* (2006.01)
*H02M 3/157* (2006.01)

(56) References Cited

U.S. PATENT DOCUMENTS

| | | | |
|---|---|---|---|
| 8,049,523 B2* | 11/2011 | Gazit | H02J 3/38 361/87 |
| 9,819,191 B1* | 11/2017 | Steffan | H02J 3/14 |
| 10,014,851 B2* | 7/2018 | Chauhan | H03K 17/687 |
| 2002/0158615 A1 | 10/2002 | Goodfellow et al. | |
| 2005/0057228 A1 | 3/2005 | Shih | |
| 2007/0195568 A1 | 8/2007 | Sato | |
| 2009/0295353 A1 | 12/2009 | De Lima Filho et al. | |
| 2010/0270979 A1 | 10/2010 | Bankhoff et al. | |
| 2012/0007613 A1 | 1/2012 | Gazit | |
| 2018/0123578 A1 | 5/2018 | Chauhan et al. | |
| 2019/0181755 A1 | 6/2019 | Swamy | |
| 2019/0324063 A1 | 10/2019 | Baorda et al. | |
| 2019/0348901 A1 | 11/2019 | Chen | |
| 2020/0091721 A1* | 3/2020 | Rumrill | H02J 13/00002 |
| 2023/0207004 A1* | 6/2023 | Sforzin | G11C 13/003 365/148 |

FOREIGN PATENT DOCUMENTS

| | | |
|---|---|---|
| WO | WO 2020/086507 A1 | 4/2020 |
| WO | WO 2020/159369 A1 | 8/2020 |

OTHER PUBLICATIONS

Communication pursuant to Article 94(3) received for PCT Application No. 21786899.1, Dec. 5, 2024, 7 pages.
Yuncong Jiang et al: "Study and evaluation of load current based MPPT control for PV solar systems", Energy Conversion Congress and Exposition (ECCE), 2011 IEEE, IEEE, Sep. 17, 2011 (Sep. 17, 2011), pp. 205-210, XP032067164, DOI: 10.1109/ECCE.2011. 6063770 ISBN: 978-1-4577-0542-7.
Amanor-Boadu et al., "A Switched Mode Li-ion Battery Charger with Multiple Energy Harvesting Systems Simultaneously Used as Input Sources," *2014 IEEE 57th International Midwest Symposium on Circuits and Systems (MWSCAS)*, Aug. 2014, pp. 330-333.
Bol et al., "A 0.48mm² 5µW-10mW Indoor/Outdoor PV Energy-Harvesting Management Unit in a 65nm SoC based on a Single Bidirectional Multi-Gain/Multi-Mode Switched-Cap Converter with Supercap Storage," *ESSCIRC Conference 2015—41st European Solid-State Circuits Conference (ESSCIRC)*, Sep. 2015, pp. 241-244.
IPO Search Report under Section 17(5) for GB2015686.5, dated Mar. 26, 2021, 6 pages.
International Search Report and Written Opinion for PCT/EP2021/ 077277, Mailed Jan. 5, 2022, 14 pages.
Shao et al., "The Design of a Micro Power Management System for Applications Using Photovoltaic Cells With the Maximum Output Power Control," *IEEE Transactions on Very Large Scale Integration (VLSI) Systems,* vol. 17, No. 8, Aug. 2009, pp. 1138-1142.
Zamparette et al., "A 90% Efficiency 60 mW MPPT Switched Capacitor DC-DC Converter for Photovoltaic Energy Harvesting Aiming for IoT Application," *2017 IEEE 8th Latin American Symposium on Circuits & System (LASCAS),* Feb. 2017, 4 pages.

\* cited by examiner

ENERGY SUPPLY CIRCUIT

CROSS REFERENCE TO RELATED APPLICATIONS

This is the U.S. National Stage of International Application No. PCT/EP2021/077277, filed Oct. 4, 2021, which was published in English under PCT Article 21(2), which in turn claims the benefit of Great Britain Application No. 2015686.5, filed Oct. 2, 2020.

The present invention relates to energy supply circuits for connecting energy harvesting devices to a load.

Energy harvesters convert ambient energy from the surrounding environment into a low power voltage supply. Possible sources of this ambient energy include light, thermal sources, kinetic sources (e.g. vibrations) and RF radiation.

An energy harvesting device typically acts as a power supply for a load. They often generate a small energy output, and as such, are typically suited to low-power applications. A load that receives power from an energy harvesting device, in principle, could be any suitable small system or device which consumes power—e.g. IoT sensors, remote sensors, wearables, implantables, smoke detectors etc. In many of these applications, reducing or avoiding the need to replace batteries or connect the device to a separate power source for recharging is a distinct advantage.

An energy harvesting device is typically connected to a load via a DC-DC converter circuit. The DC-DC converter circuit changes the voltage and at its output can provide power to the load. Environmental changes, such as a change in temperature, can vary the voltage at which the maximum power is obtained for an energy harvesting device This can present challenges in harvesting useful amounts of energy.

The Applicant has recognised that there are shortcomings in existing solutions for energy harvesting DC-DC converters. Therefore, the present invention seeks to develop upon existing implementations.

According to a first aspect of the present invention there is provided a circuit portion comprising:
  an energy harvesting device producing a DC output;
  a DC-DC converter having an input connected to said DC output of the energy harvesting device;
  an output for connection to a load; and
  a monitoring module comprising a non-ohmic semiconductor element and arranged to derive information relating to an output current flowing from the DC-DC converter by measuring a current through said non-ohmic semiconductor element, wherein the monitoring module is arranged to adjust one or more parameters of the DC-DC converter based on the information relating to said output current flowing from the DC-DC converter.

Thus it will be seen by those skilled in the art that, in accordance with the invention, the monitoring module uses the current through the non-ohmic semiconductor element to monitor the output current of the DC-DC converter. The monitoring module may then change the parameters of the DC-DC converter to tune the output of the circuit portion to a desired level. The Applicant has appreciated that use of a non-ohmic semiconductor element may reduce power consumption and so result in a more energy efficient supply circuit. It may also provide the opportunity to realise a secondary benefit, depending on the type of non-ohmic semiconductor element used.

In a set of embodiments for example, the non-ohmic semiconductor element comprises at least one diode. A diode can provide the required voltage drop but may also provide the secondary benefit of providing protection against reverse current.

In a set of embodiments, the non-ohmic semiconductor element comprises at least one transistor, e.g. a field-effect transistor (FET) e.g. a p-channel metal-oxide-semiconductor field-effect transistor (pMOSFET). In a set of embodiments, the transistor is configured selectively to disconnect the load. This similarly allows the required voltage drop to be provided whist providing the secondary benefit of enabling load switching. In a set of embodiments, the circuit portion comprises both n-channel metal-oxide-semiconductor field-effect transistors (nMOSFETs) and p-channel metal-oxide-semiconductor field-effect transistor (pMOSFETS).

The monitoring module could comprise a single transistor but in a set of embodiments the transistor is a first transistor and the monitoring module further comprises at least a second transistor arranged to pass a fixed proportion of the DC-DC converter output current passed by the first transistor. In such an arrangement the second transistor may act as a replica transistor. It may be easier and more power efficient to measure the current through the second transistor in order to derive information regarding the DC-DC converter output current. The replica transistor may compensate for the variability of the resistance between the terminals of the first transistor due to changing conditions, e.g. voltage, temperature, and process variations. The second transistor may have a width much smaller than the first transistor so that the current through the second transistor is scaled.

In a set of embodiments, the transistor forms part of a load switch. In a set of embodiments, the circuit portion comprises two or more load switches, each load switch providing a connection to a respective load.

In a set of embodiments, e.g. where there are a plurality of loads as mentioned above, the circuit portion comprises two or more power paths. In a set of such embodiments, the monitoring module is configured to monitor a sum of the currents for the two or more power paths. For example, a first power path may be connected to a battery and a second power path maybe connected to a functional system e.g. a module forming part of a wearable device.

The DC-DC converter may take any suitable form. However, in a preferred set of embodiments, the DC-DC converter comprises a capacitor-based DC-DC converter. The DC-DC converter may be a switched capacitor DC-DC converter. In a set of embodiments, the DC-DC converter is an inductor-less DC-DC converter. This may have the advantage of reducing the size of the circuit as inductors are bulky and expensive components which often undesirably interact with RF receivers due to switching in the MHz range. In a set of embodiments, the DC-DC converter comprises a plurality of capacitors. This may have the advantage of boosting the voltage and improving the efficiency of the DC-DC converter.

The monitoring module may comprise a controller configured to adjust one or more parameters of the DC-DC converter.

In a set of embodiments, the adjustable parameters of the DC-DC converter comprise frequency and/or input impedance. In such a set of embodiments, the DC-DC converter may comprise an oscillator which determines an operating frequency of the DC-DC converter. The monitoring module may be arranged to adjust the operating frequency by controlling the oscillator.

In a set of embodiments, the monitoring module comprises a comparator in a comparator arrangement comprising a feedback loop. The comparator may be a Schmitt-trigger comparator. In a set of embodiments, the comparator receives one input derived from the current through the non-ohmic semiconductor element and another input from a reference voltage. The reference voltage may be a variable reference voltage. The output of the comparator comprises information relating to the output current of the DC-DC converter. The output of the comparator may comprise an indication of whether the output current of the DC-DC converter has increased. The reference voltage may be set so that the output current of the DC-DC converter is compared to an incrementally increasing reference value to enable a search for one or more optimum parameters of the DC-DC converter. In a set of embodiments therefore the feedback loop is arranged so that the monitoring module adjusts the one or more parameters of the DC-DC converter to maximise the current through the non-ohmic semiconductor element, thereby finding the maximum power point of the energy harvesting device and the DC-DC converter system. The benefit of monitoring the output current of the DC-DC converter is that the maximum power point will include any losses in the DC-DC converter.

In a set of embodiments, the monitoring module is a Maximum Power Point Tracking (MPPT) module.

Features of any aspect or embodiment described herein may, wherever appropriate, be applied to any other aspect or embodiment described herein. Where reference is made to different embodiments, it should be understood that these are not necessarily distinct but may overlap.

Figure 2:
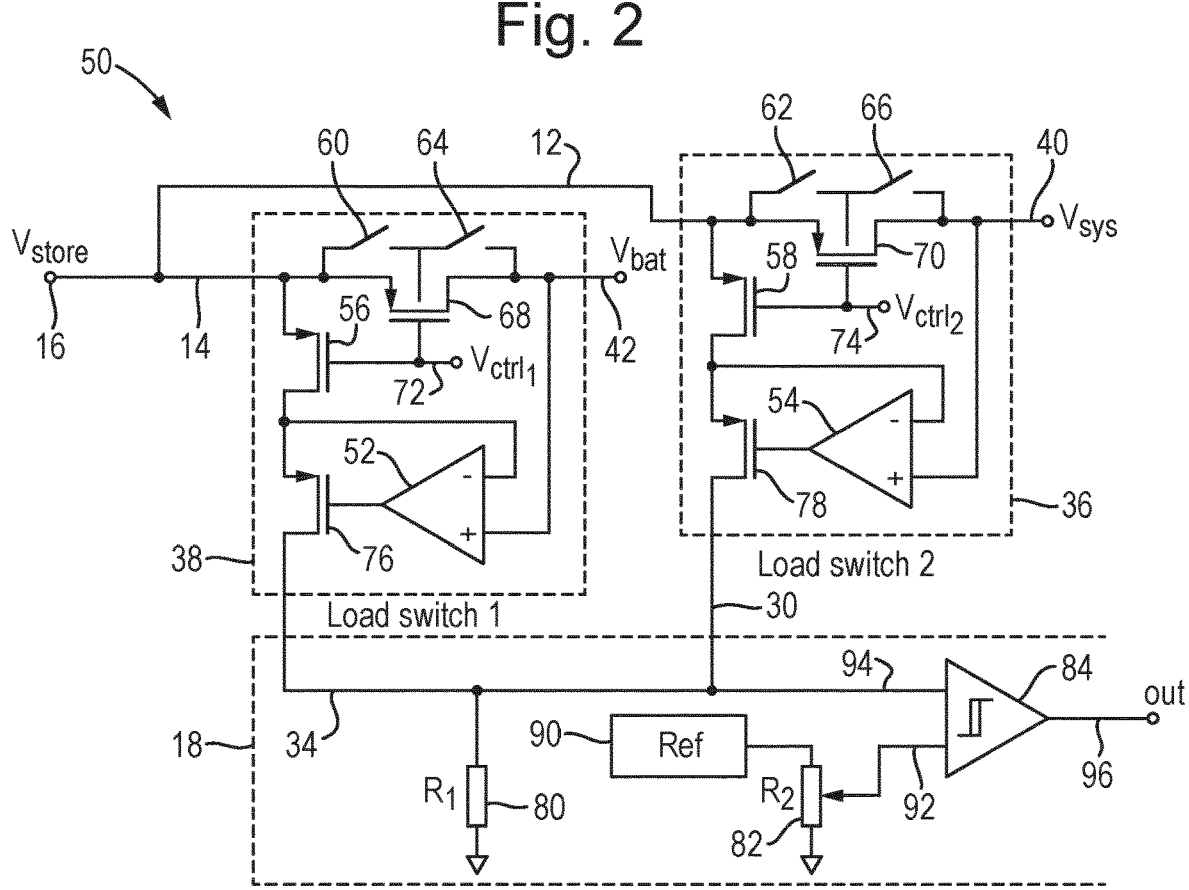

An embodiment of the invention will now be described, by way of example only, with reference to the accompanying drawings in which:

FIG. 1 schematically shows an embodiment of the circuit portion in accordance with the invention; and FIG. 2 shows in more detail the current-sensing part of the circuit portion of FIG. 1.

FIG. 1 is a schematic representation of a circuit portion 2 embodying the present invention. The circuit 2 supplies two loads 44, 46 with a DC voltage-a system load 44 and a battery 46. The circuit portion 2 comprises a power source 4 in the form of an energy harvesting device, such as a photovoltaic cell, connected to a DC-DC converter 8. Although not shown in detail, this is a capacitor-based DC-DC converter (i.e. without an inductor) which uses an oscillator to charge and discharge a capacitor to provide the desired output voltage. A number of different configurations could be used—e.g. having multiple capacitors.

The circuit portion 2 includes a current-sensing portion partly provided by two load switches 36, 38, each having a respective input 12, 14 connected in parallel to the DC-DC converter 8 and each having an output 30, 34 respectively, connected to a Maximum Power Point Tracking (MPPT) module 18. Each load switch 36, 38 also has an output 40, 42 connected to a respective load 44, 46 to selectively provide current thereto depending on the status of the switch. A capacitor 19 in parallel with the two load switches 36, 38 allows the value of the voltage at the output of the DC-DC converter 8 to be stored.

The MMPT module 18 forms part of the current-sensing portion and has an output 32 connected to the DC-DC converter 8 for controlling certain parameters of the DC-DC converter 8—e.g. the operating frequency of its internal oscillator and its input impedance.

The circuit portion 2 also includes a voltage-limiting portion comprising a reference voltage source 20 connected to one input 22 of an over voltage protection (OVP) module 24. A second input 10 of the OVP 24 is connected to the output of the DC-DC converter 8. The OVP 24 has an output 26 that is connected to the DC-DC converter 8 for controlling the DC-DC converter 8.

FIG. 2 shows the current-sensing portion 50 in more detail. A portion of the MPPT module 18 is also shown. The two load switches 36, 38 are shown, both of which have the same internal architecture. As mentioned above, their respective inputs 14, 12 are connected to the output of the DC-DC converter 8 and thus also connected to the capacitor 19 so that they can receive the stored voltage 16 therefrom. The load switches 40, 38 also each have a control input 72, 74 which receives a control signal from elsewhere on the device. The control voltages (Vctrl1 or Vctrl2) provided to these inputs 72, 74 are connected to ground or VDD to open or close the load switches 38, 36, or may be set to a control voltage in a current-limiting configuration. The outputs 42, 44 of the load switches are connected to the battery 46 and system 44 respectively which form the two loads.

Internally the load switches 36, 38 each comprise: an operational transconductance amplifier (OTA) 52, 54; a pass-FET 68, 70; a replica FET 56, 58 and a sense FET 76, 78 which are pMOSFETs in this example. In an alternative implementation, the sense FETs 76, 78 could be nMOSFETs, in which case the polarity of the inputs to the amplifier 52, 54 would be reversed. The pass-FET 68, 70 and the replica FET 56, 58 together provide a non-ohmic semiconductor element. The replica FET 56, 58 is scaled down in size relative to the pass FET 68, 70, e.g. by a factor of a thousand. The pass-FET 68, 70 employs bulk switching wherein the source and drain terminals of the pass-FET 68, 70 can be respectively connected to their own bulk terminals via respective switches 60, 64, 62, 66 to ensure that the parasitic p-n junctions between the source, drain and bulk connection of each pass-FET 68, 70 are at a high impedance.

The gate of the pass-FET 68 is connected to the gate of the replica FET 56, 58 and the control voltage input 72, 74. The source of the pass-FET 68, 70 is connected to the source of the replica FET 56, 58 and the drain of the replica FET 56, 58 is connected to the source of the sense FET 76, 78. The amplifier 52, 54 has its inverting terminal connected to the drain of the replica FET 56, 58 and the source of the sense FET 76, 78 and its non-inverting terminal connected to the drain of the pass-FET 68, 70. The amplifier 52, 54 has a single-ended output connected to the gate of the sense FET 76, 78.

As well as having an output connected to either the battery 46 or the system load 44, each load switch 38, 36 also has a respective sense current output 34, 30 from each sense FET 76, 78 which flows into a resistor 80 to ground. The voltage across the resistor 80 provides a combined input voltage 94 to a Schmitt-trigger comparator 84. The Schmitt-trigger comparator 84 retains its value until it detects a sufficient change which enables level detection in the circuit. The comparator 84 has its second input 92 connected to a reference voltage source 90 via a variable resistor 82. This allows the voltage representing the currents 34, 30 from the load switches to be compared to a variable reference 92. The output 96 of the comparator 84 is connected to the DC-DC converter 8 via the rest of the MPPT module 18 for adjusting the parameters thereof as shown in FIG. 1.

The operation of the DC-DC supply circuit will now be described with reference to FIGS. 1 and 2.

In overview, the energy harvesting power source 4 produces a current dependent on the amount of light which impinges on it. The current will therefore fluctuate as ambient light levels change. The voltage at which the current is produced is also dependent on other environmental factors such as temperature. The DC-DC converter 8 converts the voltage to a different level appropriate for the loads 40, 42. However the amount of power produced by the PV cell 4 and provided at the output of the DC-DC converter 8 depends on the environmental factors and the extent to which the DC-DC converter 8 is matched to the current conditions. In order to take account of this the MPPT module 18 adjusts the input impedance and oscillation frequency of the DC-DC converter 8, based on the output current of the DC-DC converter 8 using an MPPT algorithm, known per se in the art, to ensure that maximum power is extracted from the source 4. This is enabled by the current-sensing portion 50 of FIG. 2.

Turning to FIG. 2 it can be seen that the MPPT module 18 monitors the output current of the DC-DC converter 8 by obtaining a sense current 34, 30 from each load switch 38, 36, assuming that each switch is closed as a result of the respective control input 72, 74 being connected to ground. It will be noted that the operational transconductance amplifier 52, 54 in each switch is connected across a pair of FETs (i.e. the respective pass-FET 68, 70 and replica FET 56, 58). The arrangement means that the ratio of the sizes-uppermost FETs 56, 68 and 58, 70 respectively, e.g. of 1:1000 causes a sense current 30, 34 to flow into the resistor 80 which is proportional to (i.e. a thousandth of) the current through the pass-FET 68, 70. The paired uppermost FETs 68,56 and 70, 58 are matched, having the same length and same physical orientation on the silicon, but with the replica FET 56, 58 having a width one thousandth of the width of the pass FET 68, 70 so that the above-mentioned current proportional to the current flowing through the pass-FET 68, 70 is made to flow through the replica-FET 56, 58. The resistance between source and drain of the main pass-FET 68,70 is highly temperature, voltage and process dependent. The purpose of the replica-FET 56, 58 is to compensate for this. The source of the replica-FET 56, 58 is connected to the same net and so they share the same voltage. The operational transconductance amplifier (OTA) 52, 54 and pass-FET 76, 78 force the drain of the replica-FET 56, 58 to be at the same voltage as the pass-FET 76, 78.

The sense currents 30, 34 from both switches 38, 36 are effectively summed and converted into a voltage 94 by the resistor 80, which is compared to the reference voltage input 92 by the Schmitt trigger comparator 84 to output a value 96 which is read by the MPPT module 18 and, depending on the value 96, used to adjust the frequency and/or input impedance of the DC-DC converter. More particularly the MPPT module 18 sweeps through a range of values of frequency of the oscillator of the DC-DC converter 8 (or other DCDC control signals) to find the settings for the DC-DC converter 8 that would cause the maximum current to flow to the output 12, 14 as determined by the sense currents 30, 34. Once these are such as to reach a value at the input 94 of the comparator which matches the reference value input 92, the comparator 84 triggers at which point the variable resistor 82 providing the reference input 92 can be stepped up by another increment and the process repeated. It is assumed that the voltage 16 at the DC-DC converter output is reasonably constant so that power delivery can be maximised by maximising the current delivered.

The MPPT module 18 therefore acts to maximise the DC-DC converter 8 output current 12, 14 so that the power delivery from the energy harvesting device 4 is maximised. The arrangement depicted in FIG. 2 effectively acts as a feedback loop so that the MPPT circuit 18 adjusts parameters of the DC-DC converter 8 in order to maximise the current through both switches 36, 38, thereby finding the maximum power point of the energy harvesting source 4—e.g. the PV device, including any losses in the DC-DC converter 8.

As mentioned, when the control voltage (Vctrl1) provided to the input 72 is connected to ground, the left load switch 38 is enabled and current flows from the output thereof 42 to the battery 46. When this input 72 is connected to VDD, the left load switch 38 is disabled. Similarly, when the control voltage (Vctrl2) provided to input 74 is connected to ground, the right load switch 36 is enabled and current flows from the output 40 to the system load 44. When this input 74 is connected to VDD, the right load switch 36 is disabled. This therefore allows the device easily to exercise control over powering of the loads.

Alternatively the control inputs 72, 74 can be connected to a controlled voltage in a current-limiting configuration so that a restricted current will be output from either switch 42, 40. For example, if the control voltage provided at the control input 72, 74 were to be decreased, the gate voltage to the pass-FET 68, 70 and the replica FET 56, 58 would be reduced, which would reduce the current flowing between the source and drain terminals of each.

Turning back to FIG. 1, the over voltage protection (OVP) module 24 monitors the stored voltage (Vstore) at the capacitor 19 provided to its input 10. The OVP 24 disables the DC-DC converter 8 if a suitable voltage is reached. Once the voltage 10 falls to a lower level the DC-DC converter 8 is enabled again. This may prevent damage to the load—e.g. the battery 46—which could be caused by an excessive supply voltage. Other implementations may be more complicated than the one shown in FIG. 1. For example, the OVP 24 may gradually change the DC-DC converter 8 operating point to maintain the Vstore voltage.

The capacitor 19 connected to the output of the DC-DC converter 8 also allows the device to be started quickly as only the capacitor 19 needs to be charged to an operational voltage 16 which is provided to the load switches rather than the voltage at say the battery 46. Bulk switching is included in the load switches 36, 38 by means of the switches 60, 62, 64, 66 to provide reverse isolation in both directions. As previously described, there is a parasitic p-n junction between the source/drain and bulk connection of the pass-FET 68, 70. The bulk must be at the highest voltage so the parasitic p-n junction remains reverse biased and so no current flows through it. The switching allows the bulk voltage to be chosen so that it is always at the highest voltage relative to the source and drain. This is an optional feature which is more complex in implementation but it means the battery 46 can never be charged unintentionally, even when the storage voltage (Vstore) 16 exceeds the battery voltage (Vbat) 42. Without bulk switching, current in one direction would not be controlled.

One advantage of the embodiment shown in FIGS. 1 and 2 is that the field effect transistors 56, 68, 58, 70 can form part of a monitoring circuit, i.e. the current-sensing circuit 50 of FIG. 2, and can also be employed in a load switch 38, 36. In the monitoring circuit, the current through the transistors 56, 68, 58, 70 is measured converted to a voltage and compared to a variable reference voltage 92, e.g. to enable maximum power point tracking. The transistors 56, 68, 76, 58, 70, 78 form a configurable load switch which can either be opened to disconnect the load if necessary, or can be supplied with a control voltage to form a current-limiting configuration.

The field effect transistors 56, 68, 58, 70 that are used to monitor the current in the current-sensing circuit may be replaced with other components, such as diodes. For example, the current through one or more diodes could be measured and compared with a reference input. Using diodes in this way may provide the advantage of reducing the reverse flow of current and would thus reduce power wastage in the supply circuit.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A circuit portion comprising:
   an energy harvesting device producing a DC output;
   a DC-DC converter having an input connected to said DC output of the energy harvesting device;
   an output for connection to a load; and
   a monitoring module comprising a non-ohmic semiconductor element and arranged to derive information relating to an output current flowing from the DC-DC converter by measuring a current through said non-ohmic semiconductor element,
   wherein the monitoring module is arranged to adjust one or more parameters of the DC-DC converter based on the information relating to said output current flowing from the DC-DC converter.

2. The circuit portion as claimed in claim 1, wherein the non-ohmic semiconductor element comprises at least one transistor.

3. The circuit portion as claimed in claim 2, wherein the transistor is configured selectively to disconnect the load.

4. The circuit portion as claimed in claim 2, wherein the transistor is a first transistor and the monitoring module further comprises at least a second transistor arranged to pass a fixed proportion of the DC-DC converter output current passed by the first transistor.

5. The circuit portion as claimed in claim 1, wherein the transistor forms part of a load switch.

6. The circuit portion as claimed in claim 1, wherein the circuit portion comprises two or more load switches, each load switch providing a connection to a respective load.

7. The circuit portion as claimed in claim 6, comprising two or more power paths, wherein the monitoring module is configured to monitor a sum of currents for the two or more power paths.

8. The circuit portion as claimed in claim 1, wherein the DC-DC converter is a capacitor-based inductor-less DC-DC converter.

9. The circuit portion as claimed in claim 1, wherein the DC-DC converter comprises a plurality of capacitors.

10. The circuit portion as claimed in claim 1, wherein the adjustable parameters of the DC-DC converter comprise frequency and/or input impedance.

11. The circuit portion as claimed in claim 1, wherein the monitoring module comprises a comparator in a comparator arrangement comprising a feedback loop.

12. The circuit portion as claimed in claim 11, wherein the comparator arrangement comprises a Schmitt-trigger comparator.

13. The circuit portion as claimed in claim 11, wherein the comparator receives one input derived from the current through the non-ohmic semiconductor element and another input from a variable reference voltage.

14. The circuit portion as claimed in claim 11, wherein the feedback loop is arranged so that the monitoring module adjusts the one or more parameters of the DC-DC converter to maximise the current through the non-ohmic semiconductor element.

* * * * *